United States Patent [19]
Lee

[11] 3,802,253
[45] Apr. 9, 1974

[54] ULTRASONIC BIOMEDICAL MEASURING AND RECORDING APPARATUS

[75] Inventor: Robert D. Lee, San Mateo, Calif.

[73] Assignee: The United States of America as represented by the Administrator of the National Aeronautics and Space Administration, Washington, D.C.

[22] Filed: Aug. 18, 1972

[21] Appl. No.: 281,876

[52] U.S. Cl. .................................. 73/67.9, 128/2 V
[51] Int. Cl. ........................................... G01n 29/04
[58] Field of Search .................. 73/67.9, 67.7, 67.8; 128/2 V

[56] References Cited
UNITED STATES PATENTS

| | | | |
|---|---|---|---|
| 3,570,279 | 3/1971 | Davies | 73/67.9 |
| 3,454,922 | 7/1969 | Dory | 73/67.9 |
| 3,280,622 | 10/1966 | Carlin | 73/67.9 |

Primary Examiner—Richard C. Queisser
Assistant Examiner—Arthur E. Korkosz
Attorney, Agent, or Firm—Darrell G. Brekke; Armand G. Morin, Sr.; John R. Manning

[57] ABSTRACT

A train of ultrasonic pulses is beamed into the body of an animal. Organs intercepted by said beam reflect echo pulses with a train of such echo pulses following each transmitted pulse. An electronic gate having a variable width and a variable time delay relative to the transmitted pulse is utilized for selecting echoes derived from certain portions of the organs corresponding to a certain depth of penetration and for excluding echoes derived from other organs or portions of organs. The integral of the echo signals received within the first half of the gate period is subtracted from a corresponding integral of the echo signal received during the second half of the gate to derive an error signal for controlling the time delay of the gate. In this manner, the selected echo signal is always maintained in the center of the gate.

2 Claims, 6 Drawing Figures

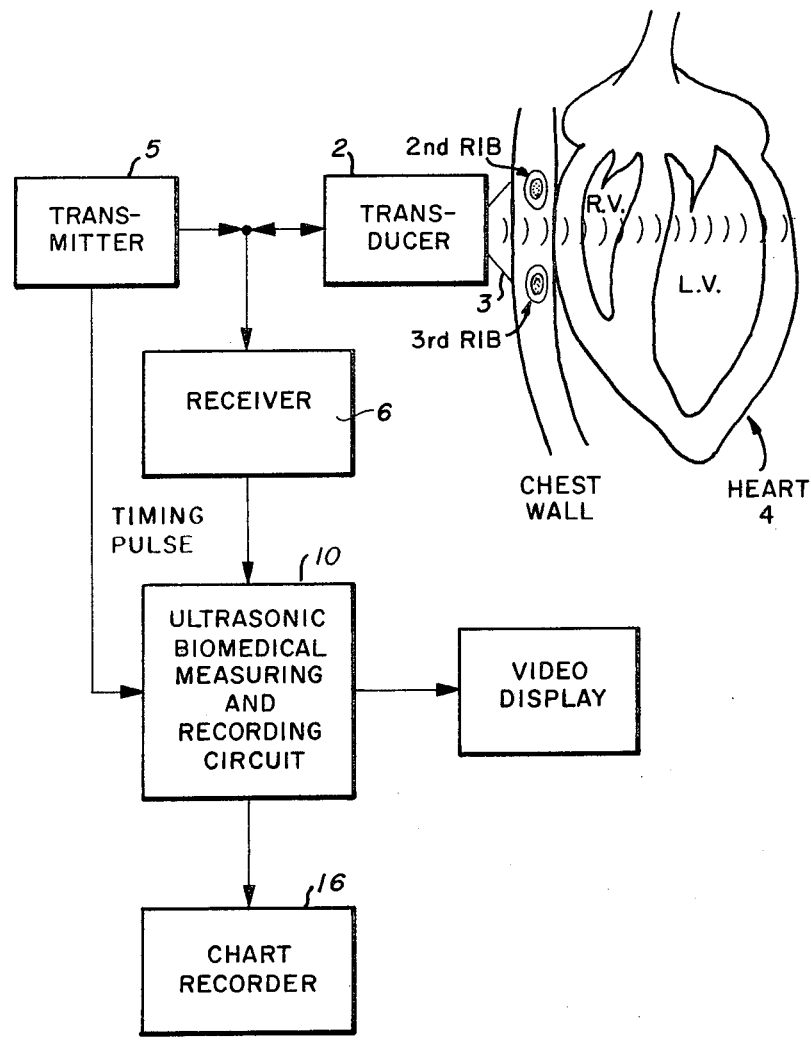
Fig_1

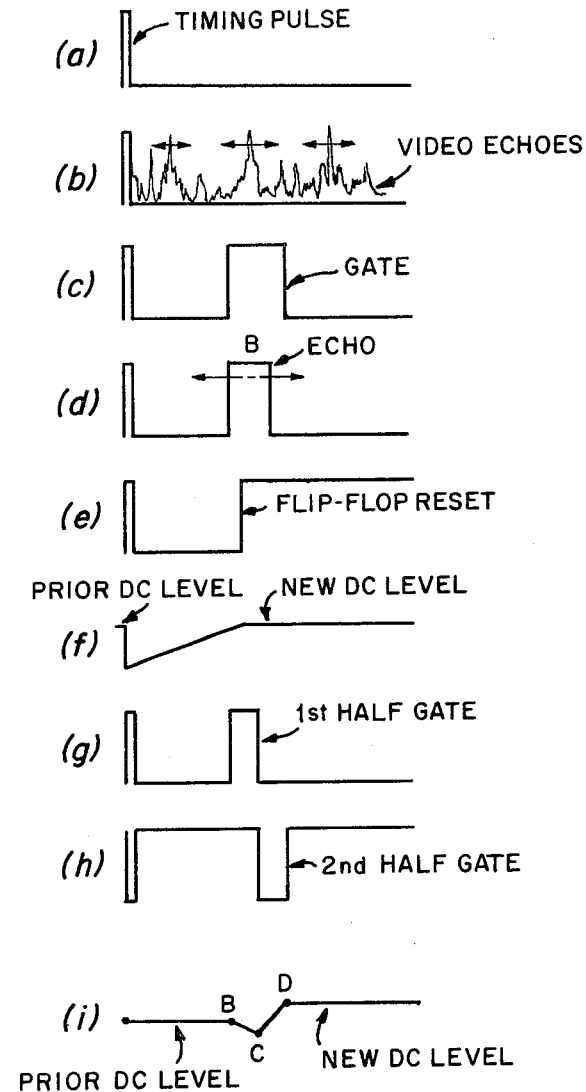
Fig_2
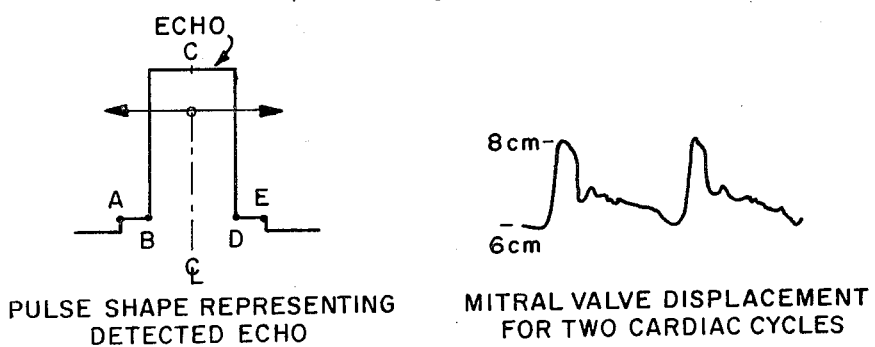
PULSE SHAPE REPRESENTING
DETECTED ECHO
Fig_3
MITRAL VALVE DISPLACEMENT
FOR TWO CARDIAC CYCLES
Fig_4

3,802,253

ULTRASONIC BIOMEDICAL MEASURING AND RECORDING APPARATUS

GOVERNMENT RIGHTS

The invention described herein was made by an employee of the United States Government and may be manufactured and used by or for the Government for governmental purposes without the payment of any royalties thereon or therefor.

DESCRIPTION OF THE PRIOR ART

Heretofore, ultrasonic biomedical measuring and recording devices have employed electronically controlled gates between the echo receiver and display element for selecting certain echoes having a certain delay following each transmitted ultrasonic pulse for observing movements of certain portions of an organ, such as a valve of the heart with time. Such prior ultrasonic measuring devices have also included an automatic gate depth control circuit which attempted to center the selected echo signals within the gate interval for improving the signal-to-noise ratio of the ultrasonic measuring and recording apparatus. Such a prior art system is disclosed in U.S. Pat. No. 3,238,767 patented Mar. 8, 1966.

In this prior device, the first peak of the selected echo was detected and its position relative to the center of the gating interval was employed for deriving an error signal for centering the first peak of the selected echo within the gating interval.

The problem with this prior art scheme is that the first peak of the echo signal may not occur in the center of the selected echo signal. If the echo signal is not centered in the gating interval, the gate must be wider than necessary and may, therefore, pick up echo signals from other reflective elements not under observation. In addition, if the gating period is too narrow, desired signal is lost.

Since the typical echo signal contains a plurality of peaks it is desired to obtain a method for controlling the time delay of the gating interval so that the echo signal is centered within the gating interval.

SUMMARY OF THE PRESENT INVENTION

The principal object of the present invention is the provision of an improved ultrasonic biomedical measuring and recording apparatus.

In one feature of the present invention, the electronic gate which selects the desired echoes to be observed has its depth or time delay relative to the transmitted pulse automatically controlled by measuring the selected echo signals during the first and second halves of the gating interval and subtracting one from the other to derive a difference or error signal which is employed for controlling the time delay of the gate, such that the gate interval is centered with respect to the desired echo signal.

In another feature of the present invention, the selected echo signal is integrated during the first and second halves of the gating interval, the second half integral being subtracted from the first half integral to derive an error signal for controlling the depth of the gate.

In another feature of the present invention, the selected echo signal is employed for charging a capacitor during the first half of the gating interval and for discharging the capacitor during the second half of the gating interval to derive an error voltage on the capacitor at the end of the gating interval, such error voltage being employed for controlling the time delay of the gate.

Other features and advantages of the present invention will become apparent upon a perusal of the following specification taken in connection with the accompanying drawings wherein:

BRIEF DESCRIPTION OF THE DRAWINGS

FIG. 1 is a schematic block diagram of an ultrasonic biomedical measuring and recording apparatus incorporating features of the present invention, FIG. 2 is a composite waveform diagram depicting certain waveforms at certain locations in the circuits of FIG. 1 and 5, FIG. 3 is a waveform of an echo after squaring, and depicting the echo position within the gate interval, FIG. 4 is an analog trace of the output signal of the biomedical measuring and recording apparatus of FIGS. 1 and 5 showing two cardiac cycles of the mitral valve displacement.

DESCRIPTION OF THE PREFERRED EMBODIMENTS

Figure 5A:
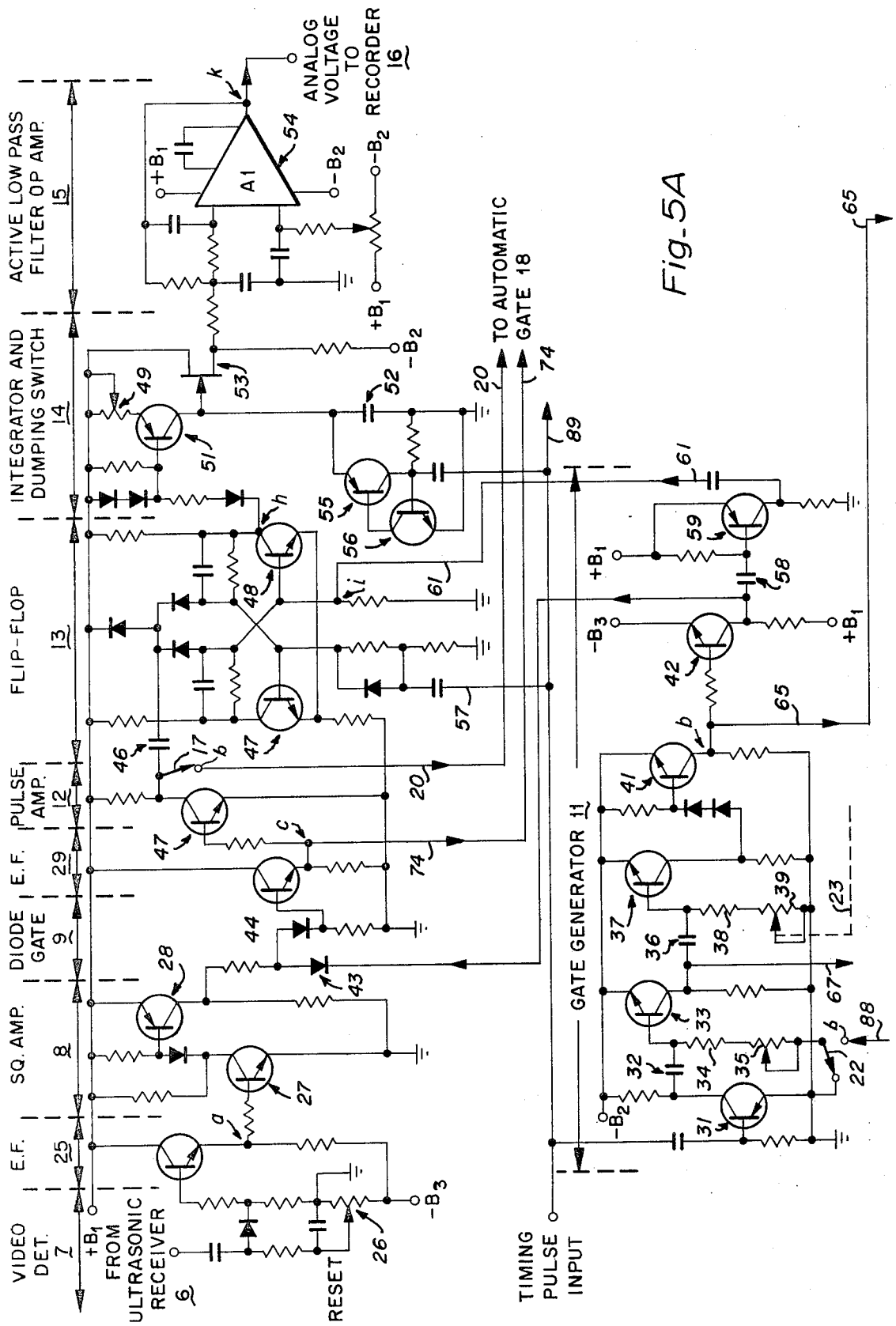
FIGS. 5A and 5B are detail circuit diagrams for those respective portions of the circuit of FIG. 1 delineated by the lines 5A—5A and 5B—5B, respectively.

Referring now to FIG. 1, there is shown, in block diagram form, an ultrasonic biomedical measuring and recording apparatus incorporating features of the present invention. The measuring apparatus includes an ultrasonic transducer 2 coupled to the skin 3 of an animal under observation, such as a cardiac patient. The transducer 2 is positioned to direct its beam of ultrasonic wave energy into a portion of the body under observation, such as the heart 4 of the patient.

An ultrasonic transmitter 5 energizes the transducer 2 with a train of pulsed high frequency energy for exciting the transducer 2. In a typical example, the ultrasonic transmitter 5 excites the transducer 2 with pulses of high frequency energy, as 10 MHz, with a pulse duration of one to several microseconds and a pulse repetition frequency of 1,000 pulse per second. Echoes received after each pulse of ultrasonic energy as produced by interception of the ultrasonic beam by various organs or portions of organs within the body, are picked up by the transducer 2 and fed to an ultrasonic receiver 6. In the receiver, the echo signals are amplified and thence into the input of an ultrasonic biomedical measuring and recording circuit including, a video detector (See FIGS. 5A and 5B for circuit details) to produce a train of video echo pulses, as shown in waveform $b$ of FIG. 2. As an example, waveform $b$ of FIG. 2 shows the typical reflected ultrasonic echo from a heart. Point A in waveform $b$ is the center of the group of echoes reflected from the anterior (near) heart wall, whereas point B is the center of the group of echoes reflected from the mitral valve, and point C is the center of the echoes from the posterior (far) heart wall.

The video echoes are fed from the video detector 7 to the input of a squaring amplifier 8 which squares each group of echoes in the manner as shown in waveform $d$ where the waveform shown therein is the squared group of echoes from the mitral valve. The other groups of echoes are similarly squared. The output of the squaring amplifier 8 is fed through a diode gate 9 which selects, via a delayed gating interval (window), the desired squared echo signal to be observed.

The diode gate 9 is controlled from the output of a gate depth and width generator 11 which is triggered from the transmitted pulse derived from the ultrasonic transmitter 5 and transducer 2. A controllable time delay circuit within the gate depth and width generator 11 control the time delay of opening of the gate 9, and the width of the gate interval, relative to the leading edge of the transmitted ultrasonic pulse.

The gated signal output of gate 9 is fed to a pulse amplifier 12 and thence to a flip-flop 13 which controls an integrator 14. More particularly, the leading edge of the selected echo pulse, derived from the output of the pulse amplifier 12, is differentiated to derive a signal for switching (resetting) the flip-flop 13 in the manner as shown by waveform $e$ of FIG. 2. When the flip-flop 13 is reset by the leading edge of the selected echo pulse, it stops the flow of current to an integrator 14, such integration having been commenced by a sample of the transmitter signal derived from transducer 2, which initially set the condition of the integrator and flip-flop 13.

Thus, the charge or voltage on the integrator 14 is in proportion to the time delay between the sending out of the transmitter pulse and the receipt of the selected echo. The DC level on the output of the integrator 14 waveform $f$ is then a measure of the distance from the transducer to the element under observation. This DC level is held until the next ultrasonic transmitter pulse is beamed into the animal under observation. On sending out of the next transmitter pulse, a sample of the transmitter pulse is applied to the integrator 14 for dumping the charge on the capacitor.

Thus, the DC voltage level, determined by the distance from the transducer to the organ under observation, is held on the integrator 14 for most of the period between successive transmitted pulses. This DC level varies with movement of the organ or portion of the organ under observation. The DC level is passed from the output of integrator 14 through an active lowpass filter 15 to a recorder 16 which records the time fluctuations in the movement of the organ under observation. A typical recording of the mitral valve displacement for two cardiac cycles is shown in FIG. 4.

For improved signal-to-noise ratio, it is desirable that the gate depth, initial time delay, be automatically controlled to maintain the position of the selected echo signal within the center of the gate interval and that the gate interval be as narrow as possible to exclude undesired echoes from other organs within the body. Accordingly, switch 17, at the output of the pulse amplifier 12, is closed for directing a sample of the squared and selected echo pulse to an automatic depth gate control 18 via line 20.

The automatic gate depth control 18 includes an integrator and a circuit for dividing the gate width into two half gate width intervals. The selected echo pulse amplified is integrated for one-half of the gate interval by the integrator within the automatic gate depth control 18. During the next one-half of the gate interval the charge stored on the integrator is discharged in accordance with the amplitude of the echo signal appearing in the second-half of the gate interval. The voltage remaining on the integrator at the end of the gating interval is an error signal which is fed through a dump switch 19 to an active lowpass filter 21 and thence to the gate depth and width generator 11 via a second switch 22. The gate depth or delay is controlled by the error signal. Upon transmitting of the next ultrasonic pulse, a sample of the transmitter signal is fed to the dump switch 19 for discharging the error voltage from the integrator of the automatic gate depth control 18 such that automatic correction of the gate depth is achieved for each transmitted ultrasonic pulse.

A mechanical linkage 23 is provided between the gate depth and width generator 11 and the automatic gate depth control 18, such that an adjustment of the width of the gate signal, by adjusting an RC time constant within the gate depth and width generator 11, produces a like change in the one-half gate width control portion of the automatic gate depth control unit 18.

Figure 5B:
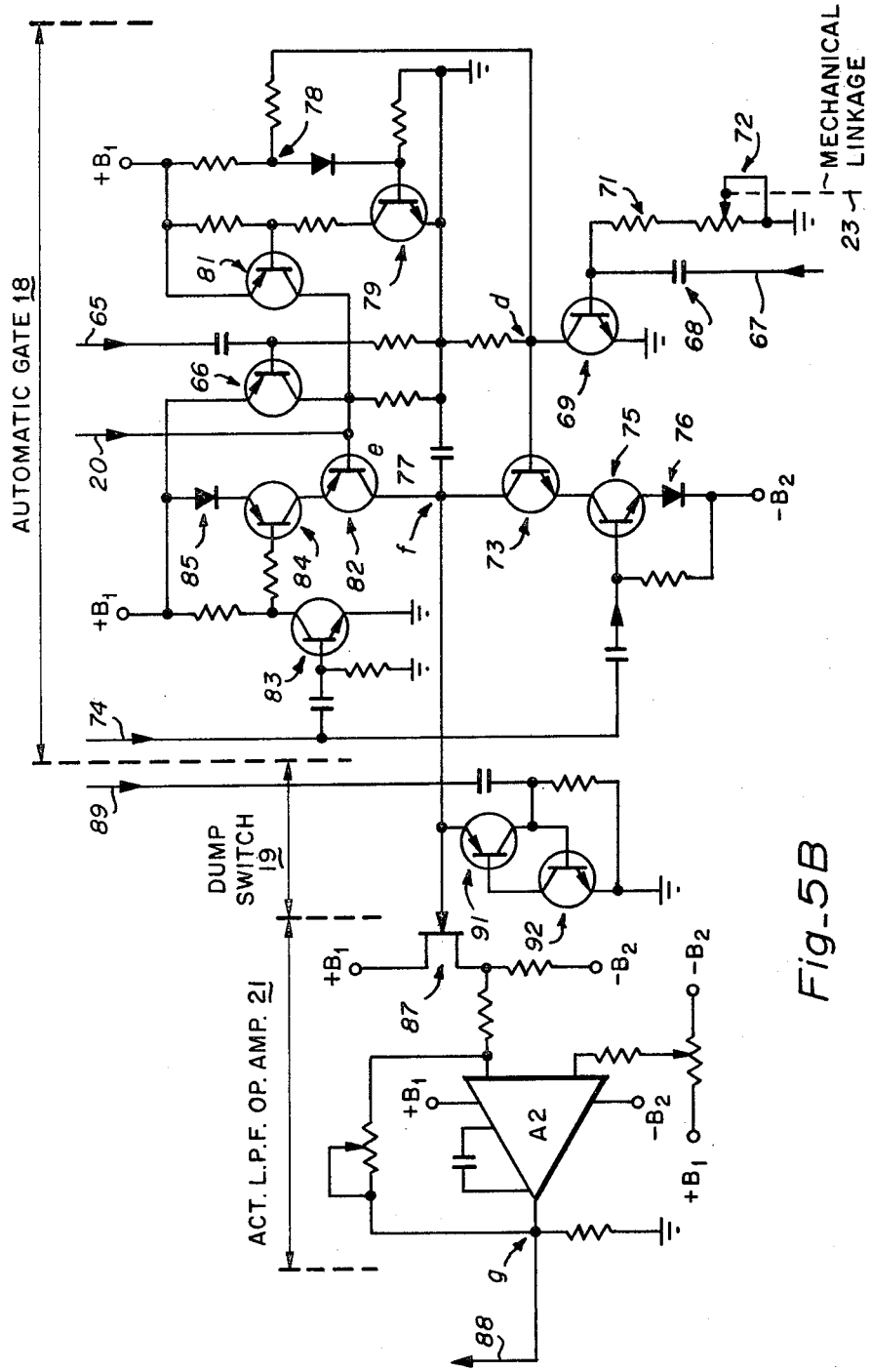

Referring now to FIGS. 5A and 5B, the biomedical measuring and recording circuit 10 will be described in greater detail. The ultrasonic echo signal output of the receiver 6 is video detected and impedance transformed by video detector 7 and emitter follower 25. The echo signal waveform at the output of the emitter follower 25 (See waveform 2 $b$) comprises all of the reflected echo signals from the organ under observation, such as the heart, which are detectable by the ultrasonic transducer 2 and which have been amplified by the receiver 6 and detected by video detector 7. The video signal at the output of the emitter follower 25 is sliced by a rejection control 26 in the video detector 7 to remove base line noise. The output of the emitter follower 25 is thence fed to a squaring amplifier 8 for amplification and pulse shaping by squaring amplifying transistors 27 and 28 whose collector outputs are gated to an emitter follower 29 via diode gate 9 for selecting a certain echo, such as echo B of waveform 2 $b$. The waveform for the squared, amplified, and gated selected echo is as shown in waveform $d$ of FIG. 2 and as shown by the waveform of FIG. 3.

The gate depth position, i.e., the time delay of the gate interval relative to the transmitted pulse, is controlled by a timing pulse from the ultrasonic transmitter that saturates switch transistor 31 in the gate generator 11 to discharge a capacitor 32 for turning off switching transistor 33 to which capacitor 32 is coupled via the base of transistor 33. Upon discharge, capacitor 32 starts integrating through gate control resistors 34 and 35 until the reverse bias on switch transistor 33 becomes forward biased to saturate switch transistor 33 for discharging a second capacitor 36, thereby turning off switch transistor 37 coupled to capacitor 36 via the base terminal of transistor 37. Upon discharge, capacitor 36 starts integrating through gate width control resistors 38 and 39 until the reverse bias on switch transistor 41 becomes forward bias saturating switch transistor 37 and generating a pulse, whose time delay from the timing pulse (transmitter pulse) is determined by the gate depth control resistances 34 and 35 and the gate depth control capacitance of capacitor 32, as shown by the gate waveform $c$ of FIG. 2.

The gate pulse width is determined by the gate width control resistance of resistors 38 and 39 and the capacitance of gate control capacitor 36. The pulse output at the collector of switch transistor 37 is inverted and shaped by switch transistor 41. The DC output level of switch transistor 41 is DC level shifted by a switch transistor 42 to produce the gate control output pulse. The output pulse from switch transistor 42 is fed to control the diode gate 9 to bias gate diode 43 to an off or non-conductive condition and diode 44 to a forward conducting state for passing the positive squared echo signal of waveform 2 d to the emitter follower stage 29. When the gate pulse terminates, switch transistor 41 is biased off, thereby saturating switch transistor 42 to forward bias gate diode 43 and reverse bias gate diode 44 to an off state, such that no echo signals can be conducted to the emitter follower 29.

The shaped echo signal, that passes through the forward biased diode gate 9 and through the emitter follower 29, is inverted and shaped by switch transistor 45. The leading edge of the squared and inverted echo pulse is differentiated by differentiating capacitor 46 in the input of the flip-flop 13 for changing the state of the flip-flop transistors 47 and 48 at point h to a conductive state, thereby turning off an integrator control resistor 49, current source transistor 51 and capacitor 52. The turn on of the flip-flop 13 is shown in waveform e of FIG. 2. Turning off of the integrating capacitor 52 is shown by waveform f of FIG. 2. The output of the integrating capacitor 52 is impedance coupled by emitter follower transistor 53 to the low-pass filter 15 which comprises an operational amplifier 54. The output of the operational amplifier 54 comprises the new DC level shown in waveform f of FIG. 2 and is thence fed to the analog recorder 16 for recording as a function of time.

The potential on the integrating capacitor 52 is proportional to the passage of time between the transmitter or timing pulse and receipt of the first echo signal within the gate interval. This potential is held on integrating capacitor 52 until the next timing pulse in the transmitted ultrasonic sequence. Upon receipt of the next timing pulse, which is applied to the input of an SCR switch configuration consisting of transistors 55 and 56, switching transistors 55 and 56 are switched to a conductive state for discharging the voltage on capacitor 52. Switching transistors 55 and 56 revert to an off state when the discharging current from capacitor 52 drops below the holding current value for the transistors 55 and 56.

The timing pulse signal also triggers the flip-flop 13 to its off state via input control line 57 as shown in waveform e of FIG. 2, to initiate current integration by storage capacitor 52, and the sequence repeats itself as aforedescribed.

If the echo signal, within the gate interval, should disappear, the flip-flop 13 is reset by the trailing edge of the gate signal. The gate trailing edge is differentiated by capacitor 58, in the gate depth and width generator 11 at the output of transistor 42. The differentiated trailing edge of the gate signal is shaped and inverted by switch transistor 59 and coupled to point i of the flip-flop 13 via line 61 for resetting the flip-flop and turning off the integrating current to capacitor 52. Resetting the flip-flop 13 at the trailing edge of the gate, in the absence of the echo signal, prevents the potential of capacitor 52 from rising to near $+B_1$ potential which could otherwise generate large spikes on the recorded output signal. The integrator 52 is calibrated simply by adjusting the gate depth potentiometer 35 and current limiting variable resistor 49, and by measuring the depth to the gate trailing edge in the absence of video signals.

Referring now to FIG. 5B, there is shown the automatic gate depth control for automatically centering the gate interval at the center of the selected received echo signal. More particularly, switches 17 and 22, at the input to the flip-flop 13 and at the control input of the gate generator 11, are closed to positions b respectively. A sample of the gate pulse derived from the output of gate transistor 41, in the gate depth and width generator circuit 11 is coupled via line 65 to the base of switch transistor 66 in the automatic gate depth control circuit 18. Simultaneously, the initiating pulse for the gate pulse, derived from the output of transistor 33, is coupled via line 67 to capacitor 68 in the automatic gate depth control 18, for discharging capacitor 68 and biasing off switch transistor 69 which has its base coupled to capacitor 68.

Capacitor 68 begins charging through one-half gate control resistors 71 and 72. The values of resistors 71 and 72 are selected to be one-half the value of the gate width control resistors 38 and 39, in gate generator 11, in order to generate a pulse having a width equal to one-half of the gate interval when switching transistor 69 becomes forward biased. The output of switching transistor 69 is shown by waveform g of FIG. 2. Gate-width-control resistor 39 and the one-half gate control resistor 72 are mechanically linked together via mechanical linkage 23, such that a variation of the gate width control 39 produces a like variation in the one-half gate width control 72.

The output of transistor 69 is coupled to the base of switching transistor 73 for turning on transistor 73. The squared and gate selected echo signal appearing at the output of the emitter follower 29, which follows the diode gate 9, is coupled via line 74 to the base of switch transistor 75 such that the leading edge of the gate selected video echo signal turns on switch transistor 75 corresponding to point B of FIG. 3. This allows a constant current from diode 76 to flow through switching transistors 75 and 73 to charge an integrating capacitor 77 to a negative potential. At the center of the gating interval, switching transistor 69 turns off and reverse biases a diode 78 which turns off a switching transistor 79 turning on switch transistor 81. The gate signal present at the base of transistor 66 turns off transistor 66 which in-turn turns on switching transistor 82.

The squared and selected echo pulse on line 74 is inverted by transistor 83 which turns on transistor 84 corresponding to point C of FIG. 3, which is the center of the gate interval. A constant current from diode 85 flows through transistors 84 and 82 for charging integrator capacitor 77 toward a positive potential. Thus, as shown in waveform i of FIG. 2, the potential on integrating capacitor 77 is charged toward a negative potential during the interval from point B to point C of FIG. 3 and charged toward a positive potential from point C to point D of FIG. 3. In other words, during the first half of the gate interval, as shown by waveform g of FIG. 2, the voltage on capacitor 77 is charged toward a negative potential and during the succeeding second half of the gate interval, as shown by waveform h of FIG. 3, the charge on capacitor 77 is charged toward a positive potential.

The potential remaining on the integrating capacitor 77 at the end of the second half of the gate interval, i.e., at point D, is the time x voltage product difference of the squared and selected video echo signal during the first half and second half of the gate interval. This error signal is inverted and impedance matched by transistor 87 and coupled to the active low-pass filter 21 where it is amplified and coupled through output line 88 to modify the voltage at the gate-depth-integrating-control resistor 35, thus moving the gate depth with the error signal.

The error voltage on integrating capacitor 77 is dumped to zero by the timing pulse, corresponding to the next succeeding transmitter signal, passed through line 89 to an SCR switch configuration of transistors 91 and 92 (dump switch 19) for maintaining zero potential on the storage capacitor 77 until the leading edge of the next succeeding gate selected video echo signal is obtained, from whence the integration sequence repeats itself as described above.

The automatic-gate-depth control 18 is unique in that dual integration is performed with a single integration capacitor 77 to provide the error signal. The error signal always operates about zero potential independent of the particular selected video echo signal, i.e., it is independent of whether the echo is from the anterior heart wall or the posterior heart wall.

The automatic-gate-depth control 18, in the automatic mode, is also manually adjustable. For example, as the gate depth control 35 is moved from zero position toward, for example, the anterior wall echo, the output of the operational amplifier 21 on line 88 will vary from a negative value through zero toward a positive value, as the gate depth control maintains lock to retain the anterior wall echo in the center of the gate interval regardless of the increasing depth control value of resistance selected by potentiometer 35. However, when the demanded output voltage of the operational amplifier 21, on line 88, exceeds the capability of the operational amplifier 21, the automatic gate depth control 18 will break lock and start moving with rotation of the gate depth control to the next echo signal at which point the gate lock sequence will be repeated.

The advantages of an automatic gate depth control are several. First, the gate width can be narrowed to observe one echo signal, i.e., the mitral valve, and to follow its dynamic motion. Other non-selected cardiac signals cannot enter the tracking gate to obscure the measured data. The electronic tracking gate feature allows measurement of the center of motion of a heart structure, i.e., the mitral valve.

What is claimed is:

1. In an ultrasonic biomedical measuring apparatus; means for projecting a beam of ultrasonic pulses into the body of an animal in a direction to be explored; means for receiving echo pulses returned from portions of said body intercepting said beam; means for displaying information derived from said echo pulses; gate generating means interposed between said receiving and displaying means for selecting certain echo pulses and for limiting said display of information to that information contained in said selected echo pulses returning from a portion of said body at a particular distance within said body along the beam path, said gate generating means generating a gate a predetermined delay time after each ultrasonic pulse, means coupled to said gate generating means and said receiving means for adjusting the time delay of each of said gates relative to each of said projected pulses; said adjusting means including, means for comparing the received echo pulses during succeeding half widths of each gate to derive an amplitude difference signal, means responsive to said difference signal for shifting the time position of said gates to nullify said difference signal, thereby centering said selected echo pulses within said gates, said means for comparing said echo pulses during succeeding half widths of said gates including, means for integraging said echo pulses during succeeding half widths of each of said gates and subtracting one integral from the other to obtain said difference signal.

2. The apparatus of claim 1 wherein the received echo pulses form an echo signal, and said means for comparing includes, storage capacitor means, means for charging said storage capacitor means in accordance with the instantaneous voltage of the echo signal received during the first half of each of said gates and means for discharging said charged capacitor means in accordance with the instantaneous voltage of the echo signal received during the second half of each of said gates to produce a residual voltage on said capacitor means, said residual voltage on said capacitor means constituting said difference signal.

* * * * *